United States Patent [19]  [11]  4,358,166
Antoine  [45]  Nov. 9, 1982

[54] POSITIONING DEVICES
[75] Inventor: Jacquet-Maurice Antoine, Maurepas, France
[73] Assignee: Societe Anonyme Francaise du Ferodo, Paris, France
[21] Appl. No.: 923,020
[22] Filed: Jul. 10, 1978
[30] Foreign Application Priority Data
Jul. 20, 1977 [FR] France .................. 77 22278
[51] Int. Cl.³ ............................... F16C 27/00
[52] U.S. Cl. ..................... 308/26; 403/345
[58] Field of Search ............ 403/354, 383, 309, 345, 403/344, 366, 313, 302, 303; 308/2 A, 152, 184 A, 26, 63, 2 R, 64; 279/96, 102, 15 G; 339/256 R, 256 RT

[56] References Cited
U.S. PATENT DOCUMENTS
3,319,484 5/1967 Prest ................. 308/26 X
3,366,356 1/1968 Fisher ...................... 16/2
3,561,830 2/1971 Orndorff, Jr. ............ 308/26 X
3,743,365 7/1973 Kato ........................ 308/26
3,922,041 11/1975 Quaile et al. ............ 308/2 A X FOREIGN PATENT DOCUMENTS
1147177 4/1969 United Kingdom .

Primary Examiner—Andrew V. Kundrat
Attorney, Agent, or Firm—McAulay, Fields, Fisher, Goldstein & Nissen

[57] ABSTRACT

In a positioning device, first and second members are mounted for movement (e.g. rotation) relative to each other. At least one of the members (e.g. of plastic material) has at least one through slot defining an elastically deformable strip integral with its body portion. In a first embodiment deformable strips flank the sides of a polygonal opening or pivot on one of the members in engagement with a circular pivot or opening in the other member.

3 Claims, 3 Drawing Figures

POSITIONING DEVICES

The present invention relates to positioning devices.

Frequently, in the mechanical art it is necessary to position a member by displacement of another member. This is the case, for instance, when remote-controlling the flap of an air conditioner by means of an operating member.

It is then desirable that the motion transmission satisfy an univocal law, between the operating member and the operated or controlled member, i.e. to any given position of a member corresponds the same given position among a plurality of positions of the other member and also be progressive. Although this is generally the case at the time of construction of the device, after a period of service it ceases to be so: play or lost motion develops in the transmission and the control becomes inaccurate.

For relatively expensive assemblies means for taking up the play are employed. The complexity of such means and their cost preclude their incorporation into low cost assemblies. This is the case, for example, with motor vehicle air conditioning systems.

An object of the present invention is to provide a reliable low cost positioning device.

According to the invention a positioning device is provided characterized by the fact that a pair of motion transmitting members comprises mounting means making use of the elastic deformation of designedly flexible portion on at least one of the members, which is deformed during assembly and ensures due to its elasticity permanent contact between the operative surfaces of the members.

The invention is applicable to smooth surfaces as well as mounting employing gearing.

The present positioning devices make use of the elasticity inherent in appropriately cutout or shaped members of plastics material.

Positioning or motion transmitting device embodying the invention may be produced substantially at the same cost as conventional devices but a much longer service life, without play or lost motion which would cause the device to lose its motion transmitting accuracy.

The description which follows, given by way of example, refers to the accompanying drawings, in which.

Figure 1:
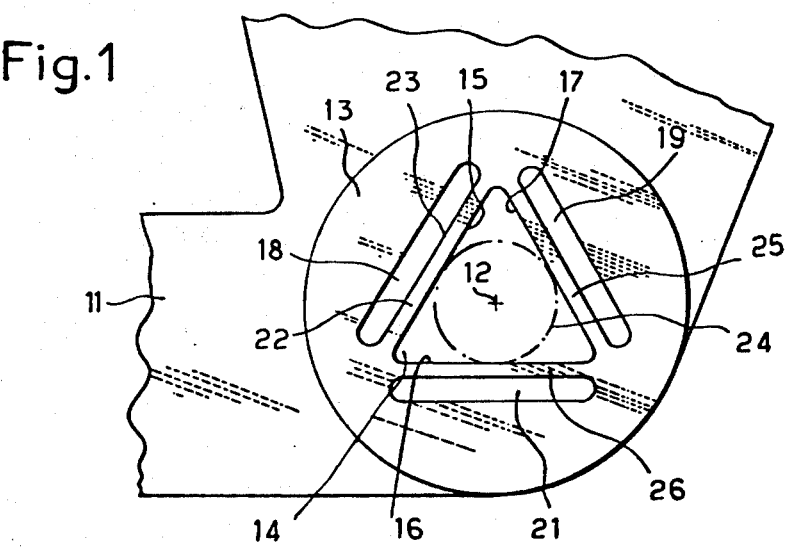
FIG. 1 is a fragmentary diagrammatic representation of a first embodiment.

Part or member 11 is adapted to be mounted for rotation about an axis 12 perpendicular to the plane of FIG. 1. A through opening 14 on the raised boss 13 of part 11 is regular polygonal shaped, advantageously triangular as illustrated, with sides 15, 16 and 17. Proximate to each of the sides of the opening are straight through slots 18, 19 and 21 on the boss 13. The length of each slot, e.g. slot 18, is of substantially the same as the corresponding flanked side of the opening 14, here side 15, spaced from and parallel to this latter, so that there is formed between slot 18 and side 15 a relatively narrow strip 22 defined by the side 15 and the edge 23 of the slot 18.

Part 11 is mounted for rotation on a pivot 24 coaxial of the axis 12 and the diameter of the pivot 24 is equal to or slightly greater than that of the circle inscribed within the sides 15, 16 and 17 of the equilateral triangular opening 14. To introduce the pivot 24 into the triangular opening 14 the strips 22, 25 and 26 are slightly deformed or stressed.

In operation, the elasticity of strips 22, 25 and 26 ensures at all times the contact of sides 15, 16 and 17 defining the triangular opening 14 with the pivot 24. Motion transmission is thus without lost motion and play even after long use. Moreover, manufacturing tolerances are accommodated.

There is substantially point of line contact parallel to axis 12 between the cylindrical pivot 24 and each of the sides 15, 16 and 17 of the triangular opening, thus the snug fit of part 11 on cylindrical pivot 24 entails little friction. According to a modified embodiment, not illustrated, the pivot has a polygonal section and slots or recesses and the opening with which it cooperates is circular.

Figure 2:
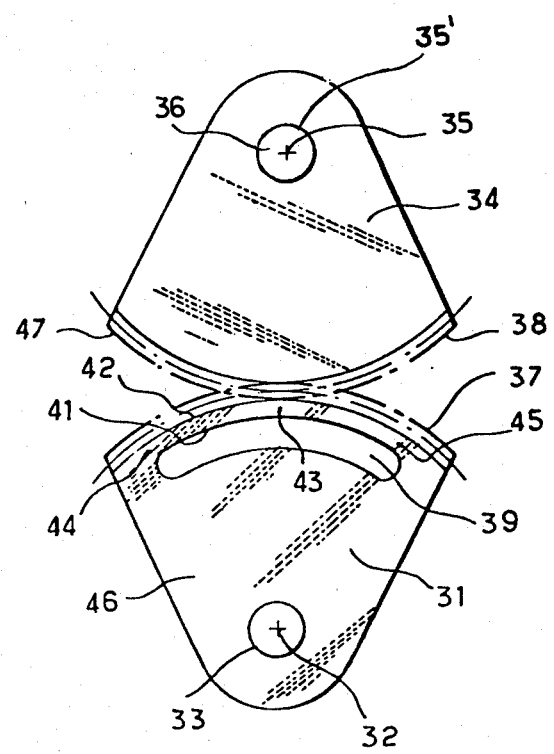
FIG. 2 is a diagrammatic representation of a second device embodying the invention.

Reference will now be had to FIG. 2, relating to another embodiment. A sector member 31 is rotatably mounted about an axis 32, for example on a pin 33 on the sector member received in a cylindrical recess parallel to axis 32. A second sector member 34 is rotatably mounted about an axis 35 by the engagement of its pin 36 in a cylindrical recess 35'. Sector member 31 has peripheral teeth 37 and sector member 34 has peripheral teeth 38 meshing with teeth 37.

A slot-like through cutout 39 is formed in one of the sector members, sector member 31 as illustrated, so that its outer edge 41 forms with the dedendum circle 42 coinciding with the bottom lands between consecutive teeth, a curvilinear strip 43 sufficiently narrow to flex elastically. The strip 43 may be considered to be embedded in the radially outer portions 44 and 45 by which it is connected to the body portion 46 of the sector member 31. Furthermore, the axes 35 and 32 are located so that meshing contact between the dedendum circle 42 of the sector member 31 from which the teeth 37 protrude and the addendum circle 47 of sector member 34 produces a force adapted to cause the elastic flexing of the strip 43.

Under these circumstances, and despite wear which may occur the contact between the teeth 37 and 38 is kept adequate, the wear being compensated for by the elastic action of the strip 43. Accurate motion transmission is thus ensured over a long service life.

The features of the embodiment of FIG. 2 may be combined with those of FIG. 1. For example, the pin 33 of the FIG. 2 embodiment may function as the cylindrical pivot 24 in the FIG. 1 embodiment.

According to a modified embodiment, not illustrated, pin 33 is replaced by an opening of equilateral triangular contour the sides of which are bordered by strips defined by through cutouts, the triangular opening snugly receives a cylindrical pivot.

According to another embodiment (not shown) the sector members are not toothed but have friction driving peripheral edges.

Figure 3:
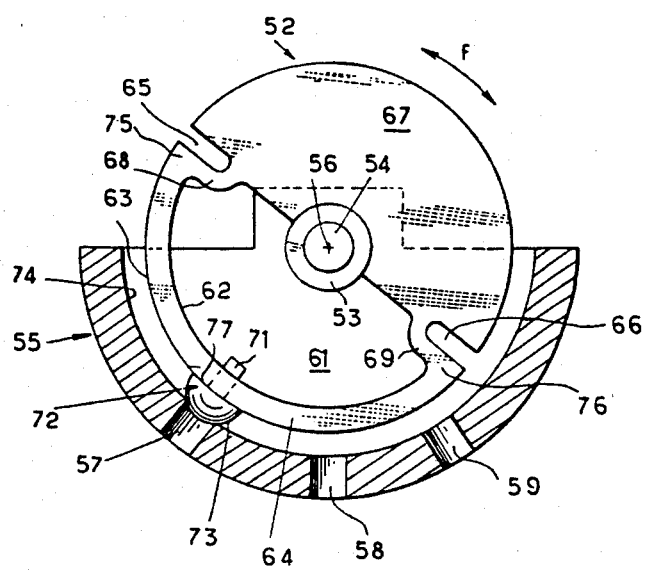
FIG. 3 is a diagrammatic representation of a third embodiment.

Reference to FIG. 3 will not be made. In this embodiment a member to be positioned is fixed to a disc 52 which is mounted for rotation by means of a tubular hub 53 about a cylindrical pivot 54 which is part of a fixed assembly. The assembly comprises an arcuate member 55 having three through holes 57, 58 and 59 angularly spaced around the axis 56 of the cylindrical pivot 54. A cutout or window 61 is formed in the disc 52 and defined by a circular arc 62 forming with the circular edge 63 of the disc 52, a relatively narrow arcuate strip 64 extending over substantially half the circumference of the disc. Notches 65 and 66 flank the strip 64 so that the strip is connected with the body 67 of the disc 52 through substantially radial bridging portions 68 and 69 of the same thickness as the strip 64. The strip 64 is traversed midway between its ends by the stem 71 of a mushroom-shaped stud 72 having a part-spherical or rounded head 73 the diameter of which is greater than that of the through holes 57, 58 and 59.

The distance between the outer edge 63 of the strip 64 and the inner edge 74 of arcuate member 55 and the axial height of the part-spherical head 73 are selected so that in the course of rotation in either direction as represented by double-headed arrow f in FIG. 3, the part-spherical head 73 is biased against the inner edge 74 of the arcuate member 55 under the elastic action of the narrow strip 64 which flexes about its ends connected to radial bridging portions 68 and 69, the underside 77 of the head 73 of the stud 72 being concave and having the same radius of curvature as the outer edge 63.

As the disc 52 is turned about its axis 56 the part-spherical surface of head 73 of the stud 72 is urged by the biasing force exerted by the strip 64 into engagement with one of the bores 57, 58 or 59 when the stud 72 comes into alignment therewith. Discrete, predetermined positions of the disc 52 with respect to the fixed arcuate member 55 is thus obtained. A rotational displacement of the disc 52 disengages the head 73 with the outer end of one of the bores 57 by elastic deformation of the strip 64. Thereafter the part-spherical surface of the head 73 is displaced along the adjacent part of the inner edge 64 of the fixed arcuate member 55 in substantially point contact with the same under the pressure due to elasticity of the strip 64.

The disc 52 can thereby be moved between predetermined positions with unalterable accuracy in the course of time.

What is claimed is:

1. A wear compensated positioning device comprising:
   a pivot having an outer contour;
   a member;
   a bearing surface portion integrally formed with said member;
   a polygonal shaped opening in said member having a closed inner periphery with substantially straight sides providing said bearing surface portion;
   elongated slots each substantially parallel to, and having a length substantially equal to, each of said sides, with each slot spaced from its respective side a distance effective to form a deformable strip between said side and said slot, said deformable strips being connected at their ends to adjacent ones thereof above apices only of said polygonal shaped opening; and
   said deformable strips being resiliently deflected when said opening is fitted over said outer contour of said pivot whereby a wear compensated bearing fit is formed therebetween.

2. A wear compensated positioning device according to claim 1 wherein said polygonal shaped opening is an equilateral triangle shaped opening.

3. A wear compensated positioning device according to claim 1 wherein said outer contour of said pivot is a cylinder, said sides of said polygonal shaped opening contacting said cylinder in substantially lines of contact.

* * * * *